(12) United States Patent
Liang et al.

(10) Patent No.: US 10,367,723 B2
(45) Date of Patent: Jul. 30, 2019

(54) PACKET SENDING METHOD AND APPARATUS BASED ON MULTI-LINK AGGREGATION

(71) Applicant: Huawei Technologies Co., Ltd., Shenzhen (CN)

(72) Inventors: Bo Liang, Chengdu (CN); Jichuan Wei, Chengdu (CN)

(73) Assignee: Huawei Technologies, Co., Ltd., Shenzhen (CN)

( * ) Notice: Subject to any disclaimer, the term of this patent is extended or adjusted under 35 U.S.C. 154(b) by 2 days.

(21) Appl. No.: 15/718,623

(22) Filed: Sep. 28, 2017

(65) Prior Publication Data
US 2018/0019942 A1 Jan. 18, 2018

Related U.S. Application Data

(63) Continuation of application No. PCT/CN2015/075337, filed on Mar. 28, 2015.

(51) Int. Cl.
*H04L 12/709* (2013.01)
*H04L 29/08* (2006.01)
*H04L 12/725* (2013.01)
*H04L 12/701* (2013.01)
*H04L 12/801* (2013.01)
*H04L 12/891* (2013.01)
(Continued)

(52) U.S. Cl.
CPC ............ *H04L 45/245* (2013.01); *H04L 29/08* (2013.01); *H04L 45/00* (2013.01); *H04L 45/30* (2013.01);
(Continued)

(58) Field of Classification Search
CPC ....... H04L 29/08; H04L 45/245; H04L 45/30; H04L 47/22; H04L 69/166; H04L 45/00;
(Continued)

(56) References Cited

U.S. PATENT DOCUMENTS 7,230,918 B1  6/2007 Maiya et al.
7,936,770 B1 * 5/2011 Frattura .................. H04L 49/90
                                                                  370/351
(Continued)

FOREIGN PATENT DOCUMENTS

CN        104270441 A    1/2015
WO     2014015498 A1    1/2014

*Primary Examiner* — Steven H Nguyen
(74) *Attorney, Agent, or Firm* — Slater Matsil, LLP

(57) ABSTRACT

Embodiments of the present invention provide a packet sending method, including: receiving a packet, where the packet carries priority information indicating a priority of the packet; selecting, according to a correspondence between packet priorities and component links in a link aggregation group, a component link corresponding to the priority of the packet, where the link aggregation group includes at least a first component link and a second component link, availability of the first component link is higher than availability of the second component link, and in the correspondence between packet priorities and component links, a first priority corresponds to the first component link, a second priority corresponds to at least one of the second component link and the first component link, and the first priority is higher than the second priority; and sending the packet on the selected component link.

18 Claims, 4 Drawing Sheets

(51) Int. Cl.
*H04L 12/803* (2013.01)
*H04L 12/851* (2013.01)
*H04L 12/815* (2013.01)
*H04L 29/06* (2006.01)

(52) U.S. Cl.
CPC ............ *H04L 47/10* (2013.01); *H04L 47/125* (2013.01); *H04L 47/24* (2013.01); *H04L 47/41* (2013.01); *H04L 47/22* (2013.01); *H04L 69/166* (2013.01); *Y02D 50/30* (2018.01)

(58) Field of Classification Search
CPC ....... H04L 47/10; H04L 47/125; H04L 47/24; H04L 47/41
See application file for complete search history.

(56) References Cited

U.S. PATENT DOCUMENTS

| | | | |
|---|---|---|---|
| 8,483,222 B1 * | 7/2013 | Ofelt | H04L 69/14 370/394 |
| 2004/0062198 A1 * | 4/2004 | Pedersen | H04L 45/00 370/229 |
| 2005/0160171 A1 | 7/2005 | Rabie et al. | |
| 2008/0112312 A1 * | 5/2008 | Hermsmeyer | H04L 45/00 370/228 |
| 2009/0067324 A1 * | 3/2009 | Licardie | H04L 12/40182 370/225 |
| 2010/0182920 A1 * | 7/2010 | Matsuoka | H04L 43/00 370/252 |
| 2011/0134752 A1 * | 6/2011 | Prestor | H04L 45/00 370/230.1 |
| 2012/0307628 A1 * | 12/2012 | Maeda | H04L 12/417 370/225 |
| 2014/0126511 A1 * | 5/2014 | Okazaki | H04L 5/0058 370/329 |
| 2014/0269255 A1 * | 9/2014 | Zeng | H04W 24/04 370/219 |
| 2014/0269263 A1 * | 9/2014 | Zeng | H04W 24/04 370/228 |
| 2015/0003466 A1 * | 1/2015 | Soffer | H04L 47/125 370/412 |
| 2016/0337223 A1 * | 11/2016 | Mackay | H04L 43/0888 |
| 2017/0111264 A1 * | 4/2017 | Shankarappa | H04L 47/41 |

\* cited by examiner

PACKET SENDING METHOD AND APPARATUS BASED ON MULTI-LINK AGGREGATION

CROSS-REFERENCE TO RELATED APPLICATIONS

This application is a continuation of International Application No. PCT/CN2015/075337, filed on Mar. 28, 2015. The disclosure of the aforementioned application is hereby incorporated by reference in its entirety.

TECHNICAL FIELD

Embodiments of the present invention relate to the field of communications technologies, and in particular, to a packet sending method and apparatus based on multi-link aggregation.

BACKGROUND

As network bandwidth demands grow rapidly, when a single-link bandwidth cannot meet a demand, generally, multiple physical links between two devices are bundled as a logical link, to from a Link Aggregation Group (LAG). Service traffic is jointly borne by multiple component links in the link aggregation group. In the prior art, service packets are sequentially scheduled, by using a Round Robin (RR) algorithm, to each component link for sending. However, when performance of a component link of the link aggregation group is relatively poor, efficiency and reliability of packet transmission are reduced.

SUMMARY

Embodiments of the present invention provide a packet sending method and apparatus based on multi-link aggregation, so as to overcome a problem in the prior art that efficiency and reliability of packet transmission are reduced when performance of a component link of a link aggregation group is relatively poor.

According to a first aspect, an embodiment of the present invention provides a packet sending method. The method includes receiving a packet, where the packet carries priority information indicating a priority of the packet. The method also includes selecting, according to a correspondence between packet priorities and component links in a link aggregation group, a component link corresponding to the priority of the packet, where the link aggregation group includes at least a first component link and a second component link; availability of the first component link is higher than availability of the second component link; and in the correspondence between packet priorities and component links, a first priority corresponds to the first component link, a second priority corresponds to at least one of the second component link and the first component link, and the first priority is higher than the second priority. The method also includes sending the packet on the selected component link.

In a first possible implementation manner, before the selecting, according to a correspondence between packet priorities and component links in a link aggregation group, a component link corresponding to the priority of the packet, the method further includes: sending, according to a correspondence between packet priorities and component fragment units in a fragment unit group, the packet to a component fragment unit corresponding to the priority of the packet; and fragmenting the packet in the component fragment unit to obtain multiple fragments; where the selecting, according to a correspondence between packet priorities and component links in a link aggregation group, a component link corresponding to the priority of the packet includes: selecting, according to a correspondence between component fragment units and component links, a component link corresponding to the component fragment unit; and the sending the packet on the selected component link includes: sending the multiple fragments of the packet on the selected component link.

In a second possible implementation manner of the first aspect, before the selecting, according to a correspondence between packet priorities and component links in a link aggregation group, a component link corresponding to the priority of the packet, the method further includes: fragmenting the packet to obtain multiple fragments, where the multiple fragments carry the priority information; where the selecting, according to a correspondence between packet priorities and component links in a link aggregation group, a component link corresponding to the priority of the packet includes: selecting, according to the correspondence between packet priorities and component links, a component link corresponding to the multiple fragments; and the sending the packet on the selected component link includes: sending the multiple fragments of the packet on the selected component link.

With reference to the first possible implementation manner of the first aspect, in a third possible implementation manner of the first aspect, before the selecting, according to a correspondence between packet priorities and component links in a link aggregation group, a component link corresponding to the priority of the packet, the method further includes: configuring the correspondence between component fragment units and component links according to availability of a component link in the link aggregation group and the priority of the packet that corresponds to the component fragment unit.

With reference to the first possible implementation manner of the first aspect, in a fourth possible implementation manner of the first aspect, before the selecting, according to a correspondence between packet priorities and component links in a link aggregation group, a component link corresponding to the priority of the packet, the method further includes: determining a priority of the component fragment unit according to the priority of the packet that corresponds to the component fragment unit; and configuring the correspondence between component fragment units and component links according to availability of a component link in the link aggregation group and the priority of the component fragment unit.

With reference to the first possible implementation manner in the first aspect, in a fifth possible implementation manner of the first aspect, the fragment unit group includes at least a first component fragment unit and a second component fragment unit; and in the correspondence between packet priorities and component fragment units, the first priority corresponds to the first component fragment unit, and the second priority corresponds to the second component fragment unit; and in the correspondence between component fragment units and component links, the first component fragment unit corresponds to the first component link, and the second component fragment unit corresponds to at least one of the second component link and the first component link.

With reference to the first possible implementation manner of the first aspect, in a sixth possible implementation manner of the first aspect, the sending the multiple fragments of the packet on the selected component link includes: detecting whether a traffic shaper of the component link allows sending of the fragments; and if the traffic shaper of the component link allows sending of the fragments, sending the fragments on the component link; or if the traffic shaper of the component link does not allow sending of the fragments, selecting another component link corresponding to the priority to send the multiple fragments of the packet.

With reference to the first possible implementation manner of the first aspect, in a seventh possible implementation manner of the first aspect, whether the packet needs to be fragmented is determined. If the packet does not need to be fragmented, the packet is scheduled to the selected component link.

With reference to the seventh possible implementation manner of the first aspect, before the determining whether the packet needs to be fragmented, the method further includes: reserving a bandwidth for each component link, where the reserved bandwidth is used to send a non-fragmented packet.

With reference to the first possible implementation manner of the first aspect, in a ninth possible implementation manner of the first aspect, the fragments carry fragment identifiers, so that a receive end reassembles the fragments according to the fragment identifiers.

According to a second aspect, an embodiment of the present invention provides a packet sending apparatus based on multi-link aggregation. The apparatus includes a receiving unit, configured to receive a packet, where the packet carries priority information indicating a priority of the packet. The apparatus also includes a selection unit, configured to select, according to a correspondence between packet priorities and component links in a link aggregation group, a component link corresponding to the priority of the packet, where the link aggregation group includes at least a first component link and a second component link; availability of the first component link is higher than availability of the second component link; and in the correspondence between packet priorities and component links, a first priority corresponds to the first component link, a second priority corresponds to at least one of the second component link and the first component link, and the first priority is higher than the second priority. The apparatus also includes a sending unit, configured to send the packet on the selected component link.

In a first possible implementation manner of the second aspect, the apparatus further includes: a distributing unit, configured to send, according to a correspondence between packet priorities and component fragment units in a fragment unit group, the packet to a component fragment unit corresponding to the priority of the packet; and the component fragment unit, configured to separately fragment the packet to obtain multiple fragments; where the selection unit is specifically configured to select, according to a correspondence between component fragment units and component links, a component link corresponding to the component fragment unit; and the sending unit is specifically configured to send the multiple fragments of the packet on the selected component link.

In a second possible implementation manner of the second aspect, the apparatus further includes: a fragmenting unit, configured to fragment the packet according to the priority of the packet to obtain fragments, where the fragments carry the priority information, where the selection unit is specifically configured to select, according to the correspondence between packet priorities and component links, a component link corresponding to the multiple fragments; and the sending unit is specifically configured to send the multiple fragments of the packet on the selected component link.

With reference to the first possible implementation manner of the second aspect, in a third possible implementation manner of the second aspect, the apparatus further includes: a configuration module, configured to configure the correspondence between component fragment units and component links according to availability of a component link in the link aggregation group and the priority of the packet that corresponds to the component fragment unit.

With reference to the first possible implementation manner of the second aspect, in a fourth possible implementation manner of the second aspect, the fragment unit group includes at least a first component fragment unit and a second component fragment unit; and in the correspondence between packet priorities and component fragment units, the first priority corresponds to the first component fragment unit, and the second priority corresponds to the second component fragment unit; and in the correspondence between component fragment units and component links, the first component fragment unit corresponds to the first component link, and the second component fragment unit corresponds to at least one of the second component link and the first component link.

With reference to the first possible implementation manner of the second aspect, in a fifth possible implementation manner of the second aspect, the sending unit is further configured to: detect whether a traffic shaper of the component link allows sending of the fragments; and if the traffic shaper of the component link allows sending of the fragments, send the fragments on the component link; or if the traffic shaper of the component link does not allow sending of the fragments, select another component link corresponding to the priority to send the multiple fragments of the packet.

With reference to the first possible implementation manner of the second aspect, in a sixth possible implementation manner of the second aspect, the fragments carry fragment identifiers, so that a receiving end reassembles the fragments according to the fragment identifiers.

According to a third aspect, an embodiment of the present invention provides a packet sending device based on multi-link aggregation. The device includes a communications interface, a processor, and a memory, where the communications interface, the processor, and the memory communicate with each other by using a bus, the memory stores an executable instruction, and the processor invokes the executable instruction in the memory, to perform the following operations: receiving a packet, where the packet carries priority information indicating a priority of the packet; selecting, according to a correspondence between packet priorities and component links in a link aggregation group, a component link corresponding to the priority of the packet, where the link aggregation group includes at least a first component link and a second component link; availability of the first component link is higher than availability of the second component link; and in the correspondence between packet priorities and component links, a first priority corresponds to the first component link, a second priority corresponds to at least one of the second component link and the first component link, and the first priority is higher than the second priority; and sending the packet on the selected component link.

In the embodiments of the present invention, a packet is received, where the packet carries priority information indicating a priority of the packet; a component link corresponding to the priority of the packet is selected according to a correspondence between packet priorities and component links in a link aggregation group, where the link aggregation group includes at least a first component link and a second component link, availability of the first component link is higher than availability of the second component link, and in the correspondence between packet priorities and component links, a first priority corresponds to the first component link, a second priority corresponds to at least one of the second component link and the first component link, and the first priority is higher than the second priority; and the packet is sent on the selected component link. The embodiments can distinguish between packet priorities to select a component link used for sending. Therefore, a high-priority service flow can be sent on a high-availability link, and transmission reliability of a high-priority packet can be effectively ensured, thereby improving efficiency and reliability of packet transmission.

BRIEF DESCRIPTION OF THE DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

Fiber transmission is quite mature both in technology and in network application. However, due to geographic and geomorphic limitations, transmission needs to be performed in wireless manners in many places. If a bandwidth requirement is relatively high, generally, a microwave transmission manner is used. Currently, in applications of markets such as base station backhaul transmission of a mobile cellular system, networking of a transmission network and a metropolitan area network, a digital relay transmission network of broadcast and television, a dedicated network, and large enterprise access, microwave transmission is relatively widely applied.

Frequency bands used by common-band microwave devices are 1.4 GHz to 2.7 GHz, 3 GHz to 11 GHz, 23 GHz to 55 GHz, and the like. Currently, microwave devices using frequency bands such as E-Band and V-Band also emerge. Different microwave devices may use different frequency bands, and may have different structures. For example, microwave devices may be a full outdoor-type microwave device, a split-type microwave device, and a full indoor-type microwave device. For a split-type microwave device, intermediate frequency processing is performed indoors. For a full outdoor-type microwave device, in addition to radio frequency processing, intermediate frequency processing is also performed outdoors.

Figure 1:
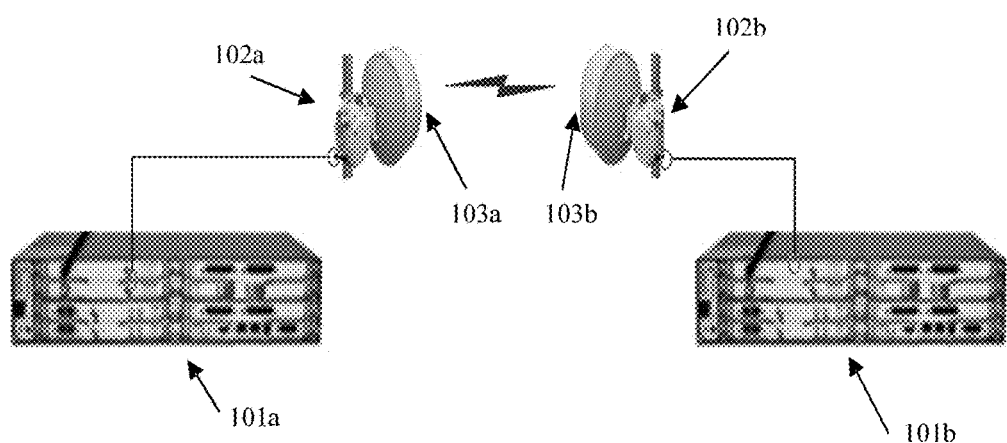
FIG. 1 is a scenario diagram of a microwave link according to an embodiment of the present invention.

A microwave link may be formed between two microwave devices. As shown in FIG. 1, two split-type microwave devices are included. A first microwave device includes an Indoor Unit(IDU) 101a, an Outdoor Unit(ODU) 102a, and an antenna 103a. A second microwave device includes an IDU 101b, an ODU 102b, and an antenna 103b. Intermediate frequency processing is performed on a baseband signal by an IDU, and radio frequency processing is performed on the baseband signal by an ODU. After such processing, the baseband signal is sent to a peer device by using an antenna.

Figure 2:
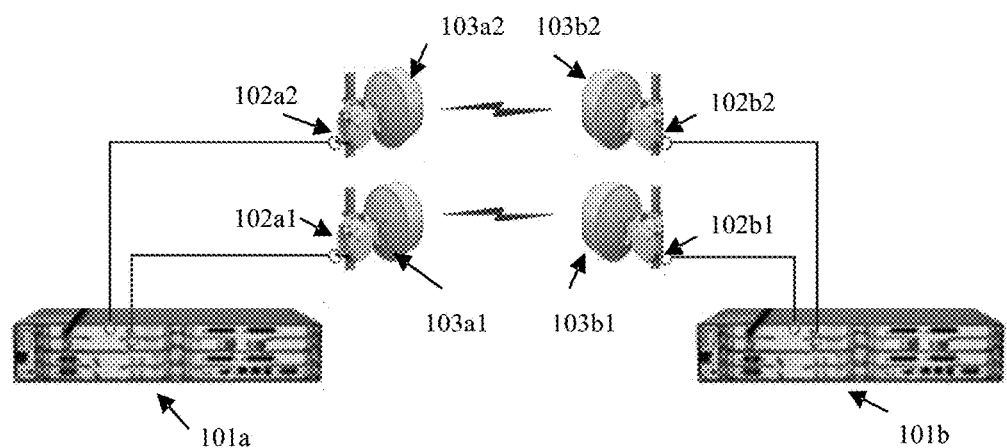
FIG. 2 is a scenario diagram of another microwave link according to an embodiment of the present invention.

A link aggregation group may be formed by two microwave links. As shown in FIG. 2, two split-type microwave devices are included. A first split-type microwave device includes an IDU 101a, an ODU 102a1, an antenna 103a1, an antenna 103b1, an ODU 102b1, and an IDU 101b, which form a first component link. A second split-type microwave device includes an IDU 101a, an ODU 102a2, an antenna 103a2, an antenna 103b2, an ODU 102b2, and an IDU 101b, which form a second component link. The two microwave devices use a same IDU 101a. In the IDU 101a, service traffic is allocated to a component link for transmission. The two microwave devices form two component links, and the two component links may form a link aggregation group. In some embodiments, a link aggregation group may be formed by three or more component links. The component link may be a microwave link, or may be a fiber link, a copper link, or another link. A link aggregation group is a high-bandwidth logical link, and transmits traffic on component links according to user configurations.

Devices that form a component link are different, and may be full outdoor-type microwave devices, split-type microwave devices, or full indoor-type microwave devices, and may use different frequencies, which may be a common band, E-Band, V-Band, and the like. Therefore, availability of component links may differ a lot. Availability may be indicated by using degrees of availability. A degree of availability is a probability value of normally running of a microwave link within a time period or an expectation value of the probability value. As shown in Table 1, Table 1 is an example of degrees of availability.

TABLE 1

| Degrees of Availability (Degrees of Availability) | System Type Unavailability (System Type Unavailability) (Unit: minute/year) | Availability (Availability) (Unit: percentage) |
| --- | --- | --- |
| Unmanaged (Unmanaged) | 50,000 | 90 |
| Managed (Managed) | 5,000 | 99 |
| Well-managed (Well-managed) | 500 | 99.9 |
| Fault-tolerant (Fault-tolerant) | 50 | 99.99 |
| High-availability (High-availability) | 5 | 99.999 |
| Very-high-availability (Very-high-availability) | 0.5 | 99.9999 |
| Ultra-availability (Ultra-availability) | 0.05 | 99.99999 |

Figure 3:
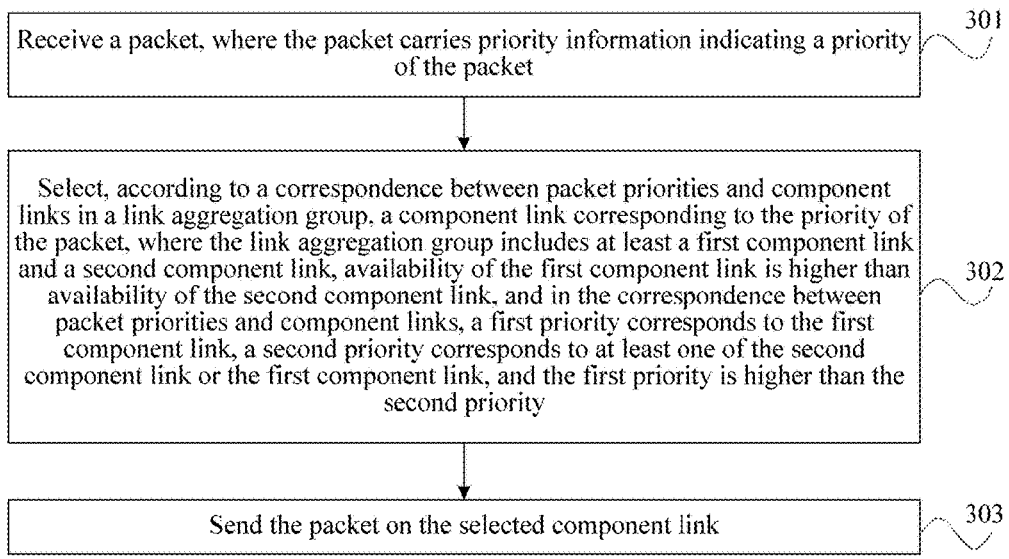
FIG. 3 is a flowchart of a packet sending method based on multi-link aggregation according to an embodiment of the present invention.

FIG. 3 is a flowchart of an embodiment of a packet sending method based on multi-link aggregation according to the present invention. As shown in FIG. 3, the method includes the following steps.

Step 301: Receive a packet, where the packet carries priority information indicating a priority of the packet.

The received packet may be an Ethernet packet. This is not limited in the present invention. For example, the received packet may be a packet in another encapsulation form. For example, the received packet may be an 802.3 packet, a High-Level Data Link Control (HDLC) packet, or a Point-to-Point Protocol (PPP) packet.

Step 302: Select, according to a correspondence between packet priorities and component links in a link aggregation group, a component link corresponding to the priority of the packet. The link aggregation group includes at least a first component link and a second component link. Availability of the first component link is higher than availability of the second component link. In the correspondence between packet priorities and component links, a first priority corresponds to the first component link, a second priority corresponds to at least one of the second component link and the first component link, and the first priority is higher than the second priority.

Using FIG. 2 as an example, generally, receiving a packet and selecting a component link corresponding to a priority of the packet to send the packet are performed in a baseband unit part of an IDU 101a. For example, the first component link is selected, intermediate radio frequency processing is performed on the packet by a transmit end on the first component link, and then the packet is sent to a receive antenna of a receiving end by using a transmit antenna. Then the packet is sent to a baseband unit of an IDU 101b after intermediate radio frequency processing by the receiving end, and then the packet is obtained through recovery.

For the packet, there may be at least two priorities, used to indicate a priority degree of the packet. For example, the priority of the packet may be a first priority, or may be a second priority. After the packet is received, priority information of the packet may be obtained by parsing a packet header.

A high-priority packet is transmitted on a high-availability component link. A low-priority packet may be transmitted on a low-availability component link. In a case in which a bandwidth of a high-availability component link is sufficient, a low-priority packet may be transmitted on the high-availability component link. Specifically, component links used for transmission may be determined according to a correspondence between packet priorities and component links. It is assumed that a possible priority of a packet is a first priority or a second priority, and the first priority is higher than the second priority. A first-priority packet is a packet having a requirement on availability of a component link, and a second-priority packet is a packet having no requirement on availability of a component link. The correspondence between packet priorities and component links needs to be preconfigured. For example, a link aggregation group includes a first component link and a second component link. Availability of the first component link is higher than availability of the second component link. The availability of the first component link can meet a requirement of the first-priority packet, and the availability of the second component link cannot meet the requirement of the first-priority packet. The correspondence between packet priorities and component links may be configured in such a manner that the first priority corresponds to the first component link, and the second priority corresponds to at least one of the second component link and the first component link.

The priority of the packet may further include another priority. For example, the priority of the packet further includes a third priority. The third priority is higher than the second priority. A third-priority packet is a packet having a requirement on availability of a component link. The availability of the first component link can meet the requirement of the third-priority packet. The availability of the second component link cannot meet the requirement of the third-priority packet. The correspondence between packet priorities and component links may be configured in such a manner that the first priority and the third priority correspond to the first component link, and the second priority corresponds to at least one of the second component link and the first component link.

The link aggregation group may further include another component link. For example, the link aggregation group further includes a third component link. Availability of the third component link is higher than the availability of the second component link, and the availability of the third component link can meet the requirement of the first-priority packet. The correspondence between packet priorities and component links may be configured in such a manner that the first priority corresponds to the first component link and the third component link, and the second priority corresponds to at least one of the first component link, the second component link, or the third component link.

Step 303: Send the packet on the selected component link.

The component link corresponding to the priority of the packet is selected according to the correspondence between packet priorities and component links, to send the packet. The packet may be directly sent on the selected component link. Preferably, the packet may be fragmented according to the priority to obtain fragments, and then component links are selected to send the fragments of the packet. If the priority of the packet corresponds to multiple component links, balanced loading of the component links may be implemented. That is, loads of the component links are generally the same, and the component links are fully utilized. For example, the first priority corresponds to the first component link and the third component link. A packet has a first priority, and after fragmenting, some fragments of the packet are transmitted on the first component link, and some fragments are transmitted on the second component link, so that balanced loading can be implemented.

Before the component link is selected, the method may specifically include the following steps.

Step A: Send, according to a correspondence between packet priorities and component fragment units in a fragment unit group, the packet to a component fragment unit corresponding to the priority of the packet.

For the packet, there may be at least two priorities, used to indicate a priority degree of the packet. For example, the priority of the packet may be a first priority, or may be a second priority. After the packet is received, priority information of the packet may be obtained by parsing a packet header.

The fragment unit group includes at least two component fragment units. A component fragment unit is configured to fragment the packet to obtain fragments. Fragment identifiers of fragments obtained by different component fragment units are different. Multiple component fragment units form one fragment unit group. After the priority information of the packet is obtained, a component fragment unit that corresponds to the packet or component fragment units that correspond to the packet may be determined according to the correspondence between packet priorities and component fragment units.

A quantity of packet priorities and a quantity of component fragment units may be the same, or may be different. One packet priority may correspond to one component fragment unit, or may correspond to multiple component fragment units. Generally, one packet priority only needs to correspond to one component fragment unit. One component fragment unit may correspond to one packet priority, or may correspond to multiple packet priorities.

The correspondence between packet priorities and component fragment units may be preconfigured. For example, the fragment unit group includes a first component fragment unit and a second component fragment unit. The correspondence between packet priorities and component fragment units is as follows: A first priority corresponds to the first component fragment unit, a second priority corresponds to the second component fragment unit, the first priority is higher than the second priority, a first-priority packet is a packet having a requirement on availability of a component link, and a second-priority packet is a packet having no requirement on availability of a component link. Certainly, the priorities may also include a third priority. A third-priority packet is a packet having a requirement on availability of a component link. The third priority may correspond to the first component fragment unit. That is, the first component fragment unit corresponds to both the first priority and the third priority.

Certainly, the fragment unit group may further include another component fragment unit. For example, the fragment unit group includes a third component fragment unit. The first priority may further correspond to the third component fragment unit. That is, the first priority corresponds to both the first component fragment unit and the third component fragment unit.

After a packet is received, a priority of the packet is obtained. Then a component fragment unit corresponding to the priority of the packet is determined according to the correspondence between packet priorities and component fragment units. If one component fragment unit corresponds to the priority of the packet, the packet is sent to the corresponding component fragment unit. If multiple component fragment units correspond to the priority of the packet, one component fragment unit is selected randomly or according to a preset rule, and the packet is sent to the selected component fragment unit. Certainly, in some scenarios, if multiple component fragment units correspond to the priority of the packet, the packet may be sent to all the corresponding component fragment units. That is, the packet is sent by using a broadcast mechanism.

Step B: Fragment the packet in the component fragment unit to obtain multiple fragments.

The packet is fragmented to obtain fragment loads. Fragments are obtained after fragment identifiers are added. The fragment identifiers include information about component fragment units to which the fragment identifiers belong, so that a receiving end identifies, according to the fragment identifiers, the component fragment units to which the fragments belong, and reassemble the fragments. Generally, the entire packet is fragmented.

In an embodiment, a fragment identifier may include one or more of a protocol identifier, a flow identifier, a sequence number, a start identifier, or an end identifier.

The protocol identifier is used to identify the fragment as a packet fragment after fragmenting.

The flow identifier is used to identify a component fragment unit to which the fragment belongs.

The sequence number is used to identify a location of the fragment.

The start identifier and the end identifier are used to identify a start fragment and an end fragment of a packet.

Figure 4:
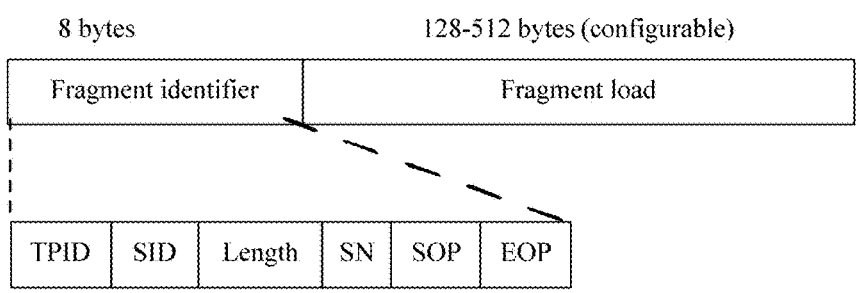
FIG. 4 is a schematic structural diagram of a fragment according to an embodiment of the present invention.

Specifically, as shown in FIG. 4 and the following Table 2, a packet is fragmented to obtain fragment loads. For example, a length of a fragment load may range from 128 bytes to 512 bytes, or may be configured autonomously according to a requirement. Then a fragment identifier is added, and a length of the fragment identifier is 8 bytes. The fragment identifier includes: a protocol identifier, used to identify the fragment as a packet fragment after fragmenting, that is, a field Tag Protocol Identifier (TPID), whose default value is 0x88A8, and may be configured according to a user's requirement; a flow identifier, used to distinguish a component fragment unit according to the bit field, where the receiving end reassembles fragments according to the identifier; a fragment length, used to indicate a length of a fragment, in a unit of byte, where the length may be configured autonomously; a sequence number, used to identify a location of the fragment, that is, a number of the fragment; and a start identifier and an end identifier, used to identify a start fragment and an end fragment of the packet, that is, a Start Of Fragment (SOF) and an End Of Fragment (EOF), where "1" indicates a start fragment or an end fragment, and "0" indicates a fragment that is a non-start fragment or a non-end fragment.

TABLE 2

| Domain name | Descriptions |
| --- | --- |
| TPID | Default value: 0x88A8, which may be configured autonomously |
| SID | A flow identifier, used to distinguish a component fragment unit according to the bit field, where the receiving end reassembles fragments according to the identifier |
| Length | Indicating a length of a fragment, in a unit of byte, where the length may be configured autonomously |
| SN | A sequence number, which is 14 bits, where if the 14 bits are occupied, the number starts from 0, and ranges from 0 to 0x3fff |
| SOP | "1" indicates a start fragment, and "0" indicates a non-start fragment |
| EOP | "1" indicates an end fragment, and "0" indicates a non-end fragment |

In step S302, the selecting, according to a correspondence between packet priorities and component links in a link aggregation group, a component link corresponding to the priority of the packet includes: selecting, according to a correspondence between component fragment units and component links, a component link corresponding to the component fragment unit.

The link aggregation group includes at least two component links. Each link may be a common-band microwave link, an E-Band microwave link, or a V-Band microwave link. A quantity of component fragment units and a quantity of component links may be the same, or may be different. One component fragment unit may correspond to one component link, or may correspond to multiple component links. One component link may correspond to one component fragment unit, or may correspond to multiple component fragment units.

The correspondence between component fragment units and component links may be preconfigured. The correspondence between component fragment units and component links may be preconfigured according to packet priorities that correspond to the component fragment units and availability of the component links in the link aggregation group. For example, the link aggregation group includes a first component link and a second component link. Availability of the first component link is higher than availability of the second component link. The availability of the first component link can meet a requirement of a first-priority packet, and the availability of the second component link cannot meet the requirement of the first-priority packet. A first component fragment unit corresponds to the first priority, and a second component fragment unit corresponds to the second priority. The first priority is higher than the second priority. The first-priority packet is a packet having a requirement on availability of a component link, and the second-priority packet is a packet having no requirement on availability of a component link. The correspondence between component fragment units and component links may be preconfigured in such a manner that the first component fragment unit corresponds to the first component link, and the second component fragment unit corresponds to at least one of the second component link and the first component link. In this way, it can be ensured that a high-priority packet is sent on a high-availability component link.

If the fragment unit group includes a third component fragment unit, the third component fragment unit corresponds to the third priority, the third priority is higher than the second priority, a third-priority packet is a packet having a requirement on availability of a component link, the availability of the first component link can meet the requirement of the third-priority packet, and the availability of the second component link cannot meet the requirement of the packet of the third priority, a correspondence between component fragment units and component links may be preconfigured in such a manner that the first component fragment unit and the third component fragment unit correspond to the first component link, and the second component fragment unit corresponds to at least one of the second component link and the first component link.

Certainly, the link aggregation group may further include another component link. For example, the link aggregation group includes a third component link. Availability of the third component link is higher than the availability of the second component link, and the availability of the third component link can meet the requirement of the first-priority packet. The correspondence between component fragment units and component links may be preconfigured in such a manner that the first component fragment unit corresponds to the first component link and the third component link, and the second component fragment unit corresponds to at least one of the first component link, the second component link, or the third component link.

A component fragment unit has a to-be-sent fragment. According to the correspondence between component fragment units and component links, if the component fragment unit corresponds to one component link, the corresponding component link is used to send the fragment; or if the component fragment unit corresponds to multiple component links, one component link is selected to send the fragment. Certainly, the fragment may be simultaneously sent on the multiple component links.

A component fragment unit corresponds to a high-priority packet, and the component fragment unit corresponds to a high-availability component link. That is, transmission of the high-priority packet is ensured. Certainly, if the component fragment unit further corresponds to a low-priority packet, component links are allocated by comprehensively determining priorities corresponding to component fragment units. A basic concept is to ensure that a high-priority packet is transmitted on a high-availability component link.

A bandwidth of a component link is limited. In this embodiment of the present invention, a leaky bucket algorithm may be used according to a bandwidth of a component link, to perform traffic shaping on the component link by using a traffic shaper, and traffic after shaping is sent. The traffic shaping is intended to limit traffic flowing to the component link, so that the traffic is sent to the outside at an average speed, so as to prevent congestion from occurring. Therefore, before a component link corresponding to a component fragment unit is selected to send a fragment of the component fragment unit, whether a traffic shaper of the component link allows sending of the fragment may be detected. If the traffic shaper allows sending of the fragment, the fragment is sent on the component link. If the traffic shaper does not allow sending of the fragment, another corresponding component link may be selected to send the fragment.

If a component fragment unit corresponds to multiple component links, one component link is selected to send a fragment. The following provides several component link selection methods.

a> In a Strict Priority (SP) algorithm, a link is selected according to a number of a traffic shaper. If the traffic shaper allows sending of fragments, sending of the fragments continues, until a weighted value of the traffic shaper is used up. Actual effects are shown in the following example. It is assumed that a component fragment unit corresponds to two component links: MAC1 and MAC2, MAC1 has a bandwidth of 100 M, and MAC2 has a bandwidth of 200 M. A traffic status is as follows: If the component fragment unit needs to send traffic of 100 M, MAC1 transmits data of 100 M, and MAC2 transmits data of 0 M. If the component fragment unit needs to send traffic of 150 M, MAC1 transmits data of 100 M, and MAC2 transmits data of 50 M.

b> In an RR algorithm, traffic is sent by turns on each link. Actual effects are shown in the following example. It is assumed that a component fragment unit corresponds to two component links: MAC1 and MAC2, MAC1 has a bandwidth of 100 M, and MAC2 has a bandwidth of 200 M. A traffic status is as follows: If the component fragment unit needs to send traffic of 100 M, MAC1 transmits data of 50 M, and MAC2 transmits data of 50 M.

c> In a Weighted Round Robin (WRR) algorithm, an effect of allocating traffic according to a ratio of link bandwidths when there is no congestion is achieved. Actual effects are shown in the following example. It is assumed that a component fragment unit corresponds to two component links: MAC1 and MAC2, MAC1 has a bandwidth of 100 M, and MAC2 has a bandwidth of 200 M. A traffic status is as follows: If the component fragment unit needs to send traffic of 90 M, MAC1 transmits data of 30 M, and MAC2 transmits data of 60 M.

There is a correspondence between component fragment units and packet priorities. Packet priorities corresponding to some component fragment units are high, and packet priorities corresponding to some component fragment units are low. If multiple component fragment units need to send fragments, differentiated scheduling may be performed. For example, fragments of high-priority packets may be preferentially scheduled, and then fragments of low-priority packets are scheduled. For ease of implementation, priorities may be allocated to the component fragment units. If a packet priority corresponding to a component fragment unit is high, a priority of the component fragment unit is high, and fragments of the component fragment unit are preferentially scheduled. If a component fragment unit corresponds to multiple packet priorities, configuration of a priority of the component fragment unit may be comprehensively determined according to the multiple packet priorities.

In step S303, the sending the packet on the selected component link may include: sending the multiple fragments of the packet on the selected component link.

Before the component link is selected, the method may further specifically include the following steps.

Step A: Fragment the packet to obtain multiple fragments, where the multiple fragments carry the priority information.

In this embodiment, a packet is fragmented to obtain fragment loads, and fragments are obtained after fragment identifiers are added, where the fragment identifiers may include the priority information.

In step S302, the selecting, according to a correspondence between packet priorities and component links in a link aggregation group, a component link corresponding to the priority of the packet includes: selecting, according to the correspondence between packet priorities and component links, a component link corresponding to the multiple fragments.

For this step, refer to the foregoing embodiments.

In step S303, the sending the packet on the selected component link may include: sending the multiple fragments of the packet on the selected component link.

In this embodiment, a packet is received, where the packet carries priority information indicating a priority of the packet; a component link corresponding to the priority of the packet is selected according to a correspondence between packet priorities and component links in a link aggregation group, where the link aggregation group includes at least a first component link and a second component link, availability of the first component link is higher than availability of the second component link, and in the correspondence between packet priorities and component links, a first priority corresponds to the first component link, a second priority corresponds to at least one of the second component link and the first component link, and the first priority is higher than the second priority; and the packet is sent on the selected component link. This embodiment can distinguish between packet priorities to perform different fragmentation, and can select, according to a correspondence between component fragment units and component links, a component link used for sending. Therefore, a high-priority service flow can be preferentially sent on a high-availability link, and when a bandwidth of a component link is reduced, sending of a high-priority service flow can be preferentially scheduled.

Figure 5:
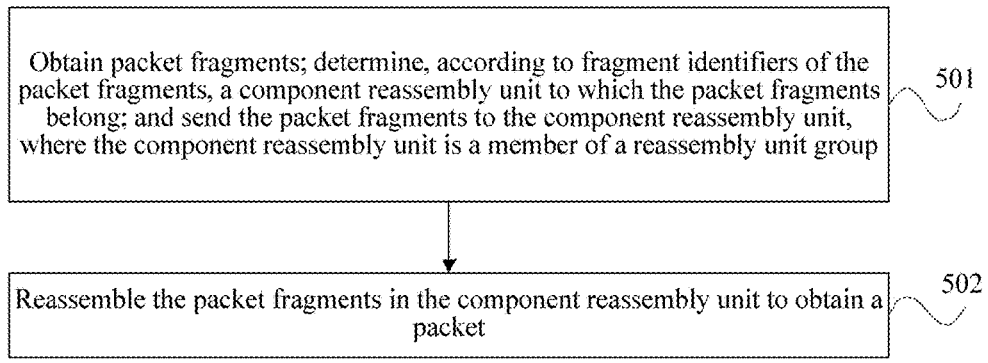
FIG. 5 is a flowchart of a packet receiving method based on multi-link aggregation according to an embodiment of the present invention.

FIG. 5 is a flowchart of an embodiment of a packet receiving method based on multi-link aggregation according to the present invention. As shown in FIG. 5, the method includes the following steps.

Step 501: Obtain packet fragments; determine, according to fragment identifiers of the packet fragments, a component reassembly unit to which the packet fragments belong; and send the packet fragments to the component reassembly unit, where the component reassembly unit is a member of a reassembly unit group.

Step 502: Reassemble the packet fragments in the component reassembly unit to obtain a packet.

In this embodiment, the component reassembly unit to which the packet fragments belong is determined according to the fragment identifiers of the packet fragments; the packet fragments are sent to the component reassembly unit; and the packet fragments in the component reassembly unit are reassembled to obtain the packet, so that fragments of different fragment identifiers can be separately reassembled, and a transmit end can be effectively supported in performing different fragmentation according to different priorities.

Figure 6:
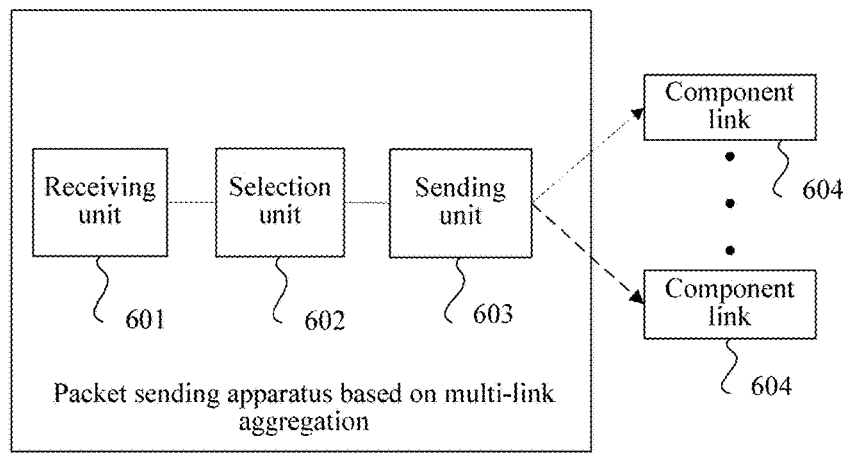
FIG. 6 is a structural diagram of a packet sending apparatus based on multi-link aggregation according to an embodiment of the present invention.

FIG. 6 is a schematic structural diagram of an embodiment of a packet sending apparatus based on multi-link aggregation according to the present invention. As shown in FIG. 6, the packet sending apparatus based on multi-link aggregation provided in this embodiment includes: a receiving unit 601, a selection unit 602, and a sending unit 603. A link aggregation group includes m component links 604, where m is an integer greater than 2.

The receiving unit 601 is configured to receive a packet, where the packet carries priority information indicating a priority of the packet.

The selection unit 602 is configured to select, according to a correspondence between packet priorities and component links in the link aggregation group, a component link corresponding to the priority of the packet. The link aggregation group includes at least a first component link and a second component link. Availability of the first component link is higher than availability of the second component link. In the correspondence between packet priorities and component links, a first priority corresponds to the first component link, a second priority corresponds to at least one of the second component link and the first component link, and the first priority is higher than the second priority.

The sending unit 603 is configured to send the packet on the selected component link.

Figure 7:
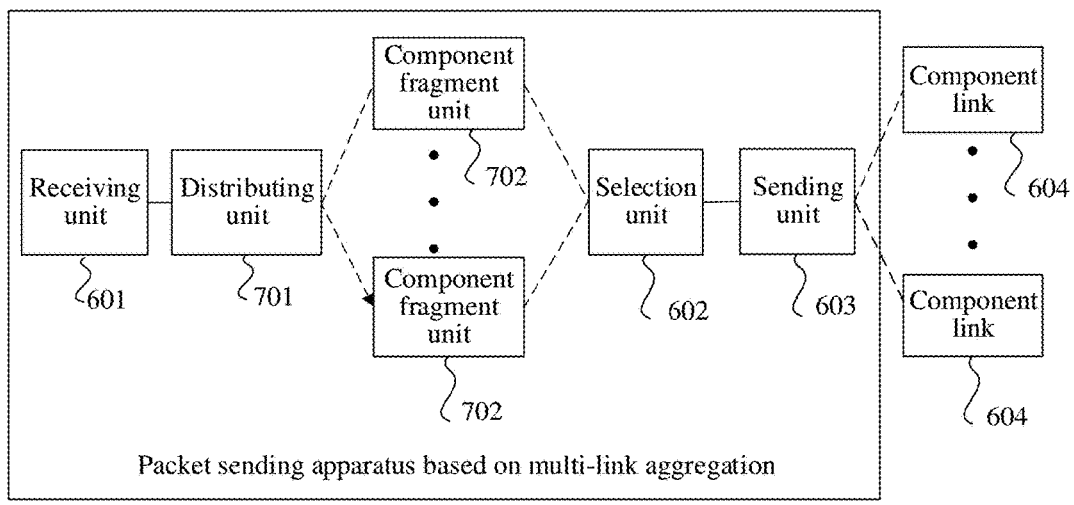
FIG. 7 is a structural diagram of another packet sending apparatus based on multi-link aggregation according to an embodiment of the present invention.

If a solution of selecting a component link after a packet is fragmented is used, as shown in FIG. 7, the apparatus may further include a distributing unit 701 and n component fragment units 702, where n is an integer greater than 2.

The distributing unit 701 is configured to send, according to a correspondence between packet priorities and component fragment units in a fragment unit group, the packet to a component fragment unit corresponding to the priority of the packet.

The component fragment unit 702 is configured to fragment the packet to obtain multiple fragments.

The selection unit 602 is configured to select, according to a correspondence between component fragment units and component links, a component link corresponding to the component fragment unit.

The apparatus may further include: a configuration module, configured to configure the correspondence between component fragment units and component links according to availability of a component link in the link aggregation group and the priority of the packet that corresponds to the component fragment unit.

The fragment unit group includes at least a first component fragment unit and a second component fragment unit. A correspondence between packet priorities and component fragment units is as follows: The first priority corresponds to the first component fragment unit, and the second priority corresponds to the second component fragment unit. The link aggregation group includes a first component link and a second component link, and availability of the first component link is higher than availability of the second component link. The correspondence between component fragment units and component links is as follows: The first component fragment unit corresponds to the first component link, and the second component fragment unit corresponds to at least one of the second component link and the first component link.

The sending unit 603 may further be specifically configured to: detect whether a traffic shaper of the component link allows sending of the fragments; and if the traffic shaper of the component link allows sending of the fragments, send the fragments on the component link; or if the traffic shaper of the component link does not allow sending of the fragments, select another component link corresponding to the priority to send the multiple fragments of the packet. In structure, the traffic shaper may be a part of a first selection subunit, and each component link corresponds to a traffic shaper.

The fragments may carry fragment identifiers, so that a receiving end reassembles the fragments according to the fragment identifiers.

If a solution of selecting a component link after a packet is fragmented is used, the apparatus may further specifically include a fragmenting unit.

The fragmenting unit is configured to fragment the packet according to the priority of the packet to obtain fragments, where the fragments carry the priority information.

The selection unit 602 is configured to select, according to the correspondence between packet priorities and component links, a component link corresponding to the multiple fragments.

The sending unit 603 is configured to send the multiple fragments of the packet on the selected component link.

The foregoing units are all logic function modules, and may be implemented corresponding to software or hardware. Software refers to using a micro code (micro code) of a network processor (NP), and hardware may be implemented by using an FPGA or switch chip. For implementation corresponding to software, the units may be invoked by a program or a function of the software. Corresponding to hardware, the units may be circuit modules.

Figure 8:
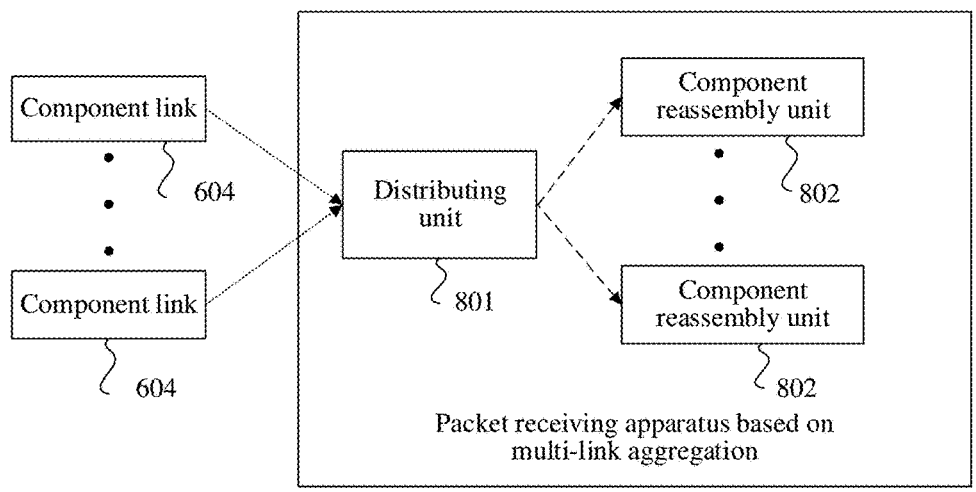
FIG. 8 is a structural diagram of a packet receiving apparatus based on multi-link aggregation according to an embodiment of the present invention.

FIG. 8 is a schematic structural diagram of an embodiment of a packet receiving apparatus based on multi-link aggregation according to the present invention. As shown in FIG. 8, the packet receiving apparatus based on multi-link aggregation provided in this embodiment may be an indoor unit in this embodiment of the present invention, or an apparatus in an indoor unit, and may be configured to perform, for example, the method shown in FIG. 3. The packet receiving apparatus includes: a distributing unit 801, and m component reassembly units 802, where m is an integer greater than 2.

The distributing unit 801 is configured to: obtain packet fragments; determine, according to fragment identifiers of the packet fragments, a component reassembly unit to which the packet fragments belong; and send the packet fragments to the component reassembly unit, where the component reassembly unit is a member of a reassembly unit group.

The component reassembly units 802 are configured to reassemble the packet fragments to obtain a packet.

The foregoing units are all logic function modules, and may be implemented corresponding to software or hardware. Software refers to using a micro code (micro code) of a NP, and hardware may be implemented by using an FPGA or switch chip. For implementation corresponding to software, the units may be invoked by a program or a function of the software. Corresponding to hardware, the units may be circuit modules.

Figure 9:
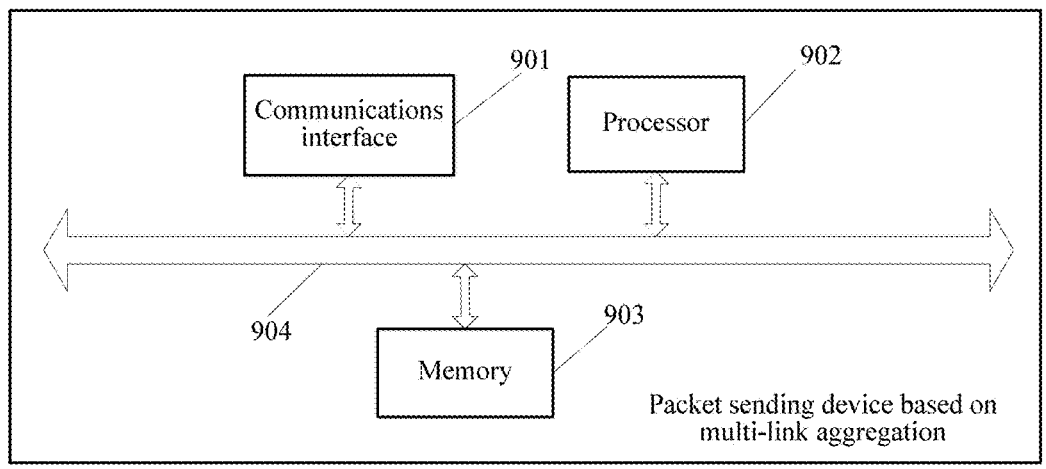
FIG. 9 is a structural diagram of another packet sending device based on multi-link aggregation according to an embodiment of the present invention.

FIG. 9 is a schematic structural diagram of an embodiment of a packet sending device based on multi-link aggregation according to the present invention. As shown in FIG. 9, the packet sending device based on multi-link aggregation provided in this embodiment includes: a communications interface 901, a processor 902, and a memory 903. The communications interface 901, the processor 902, and the memory 903 communicate with each other by using a bus 904. The memory 903 stores an executable instruction. The processor 902 invokes the executable instruction in the memory, to perform this embodiment of the present invention, for example, the steps in the method shown in FIG. 3, for example: receiving a packet, where the packet carries priority information indicating a priority of the packet; selecting, according to a correspondence between packet priorities and component links in a link aggregation group, a component link corresponding to the priority of the packet, where the link aggregation group includes at least a first component link and a second component link; availability of the first component link is higher than availability of the second component link; and in the correspondence between packet priorities and component links, a first priority corresponds to the first component link, a second priority corresponds to at least one of the second component link and the first component link, and the first priority is higher than the second priority; and sending the packet on the selected component link.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein.

In the several embodiments provided in this application, it should be understood that the disclosed system, apparatus, and method may be implemented in other manners. For example, the described apparatus embodiment is merely exemplary. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

The units described as separate parts may or may not be physically separate, and parts displayed as units may or may not be physical units, may be located in one position, or may be distributed on multiple network units. Some or all of the units may be selected according to actual needs to achieve the objectives of the solutions of the embodiments.

What is claimed is:

1. A method, comprising:
   receiving, by a device, a packet carrying priority information indicating a priority of the packet;
   sending, by the device, according to a correspondence between packet priorities and component fragment units in a fragment unit group, the packet to a component fragment unit corresponding to the priority of the packet;
   configuring, by the device, a correspondence between the component fragment units and component links in a link aggregation group, according to availability of a component link in the link aggregation group and the priority of the packet that corresponds to the component fragment unit;
   selecting, by the device, a selected component link corresponding to the priority of the packet, according to a correspondence between packet priorities and the component links, and according to the correspondence between the component fragment units and the component links, wherein the link aggregation group comprises a first component link and a second component link, wherein availability of the first component link is higher than availability of the second component link, and in the correspondence between the packet priorities and the component links, a first priority corresponds to the first component link, a second priority corresponds to the second component link or the first component link, and the first priority is higher than the second priority; and
   sending, by the device, the packet on the selected component link.

2. The method according to claim 1, wherein before selecting the selected component link corresponding to the priority of the packet, the method further comprises:
   fragmenting the packet in the component fragment unit to obtain a plurality of fragments; and
   wherein sending the packet on the selected component link comprises sending the plurality of fragments of the packet on the selected component link.

3. The method according to claim 2, wherein before selecting the selected component link corresponding to the priority of the packet, the method further comprises:
   determining a priority of the component fragment unit according to the priority of the packet that corresponds to the component fragment unit; and
   configuring the correspondence between the component fragment units and the component links according to availability of a component link in the link aggregation group and the priority of the component fragment unit.

4. The method according to claim 2, wherein the fragment unit group comprises a first component fragment unit and a second component fragment unit, and in the correspondence between packet priorities and component fragment units, the first priority corresponds to the first component fragment unit, and the second priority corresponds to the second component fragment unit; and wherein in the correspondence between component fragment units and component links, the first component fragment unit corresponds to the first component link, and the second component fragment unit corresponds to the second component link or the first component link.

5. The method according to claim 2, wherein sending the plurality of fragments of the packet on the selected component link comprises:
   detecting whether a traffic shaper of the selected component link allows sending the plurality of fragments;
   when the traffic shaper of the selected component link allows sending the plurality of fragments, sending the plurality of fragments on the selected component link; and
   when the traffic shaper of the selected component link does not allow sending the plurality of fragments, selecting another component link corresponding to the priority to send the plurality of fragments of the packet.

6. The method according to claim 2, further comprising:
   determining whether the packet is to be fragmented, and when the packet is not to be fragmented, scheduling the packet to the selected component link.

7. The method according to claim 6, wherein before determining whether the packet is to be fragmented, the method further comprises:
   reserving a bandwidth for each component link, wherein the reserved bandwidth is used to send a non-fragmented packet.

8. The method according to claim 2, wherein the plurality of fragments carry fragment identifiers, causing a receiving end to reassemble the plurality of fragments according to the fragment identifiers.

9. The method according to claim 1, wherein before selecting the selected component link corresponding to the priority of the packet, the method further comprises:
   fragmenting the packet to obtain a plurality of fragments, wherein the plurality of fragments carry the priority information;
   wherein selecting the selected component link corresponding to the priority of the packet comprises selecting, according to the correspondence between packet priorities and component links, a component link corresponding to the plurality of fragments; and
   wherein sending the packet on the selected component link comprises sending the plurality of fragments of the packet on the selected component link.

10. An apparatus, comprising:
    a receiving unit, configured to receive a packet, wherein the packet carries priority information indicating a priority of the packet;
    a distributing unit, configured to send, according to a correspondence between packet priorities and component fragment units in a fragment unit group, the packet to a component fragment unit corresponding to the priority of the packet;
    a configuration module, configured to configure a correspondence between the component fragment units and component links in a link aggregation group, according to availability of a component link in the link aggregation group and the priority of the packet that corresponds to the component fragment unit;
    a selection unit, configured to select, a selected component link corresponding to the priority of the packet, according to a correspondence between packet priorities and the component links, and according to the correspondence between the component fragment units and the component links, wherein the link aggregation group comprises a first component link and a second component link, wherein availability of the first component link is higher than availability of the second component link, and in the correspondence between the packet priorities and the component links, a first priority corresponds to the first component link, a second priority corresponds to the second component link or the first component link, and the first priority is higher than the second priority; and a sending unit, configured to send the packet on the selected component link.

11. The apparatus according to claim 10, wherein:

the component fragment unit, is configured to fragment the packet to obtain a plurality of fragments;

the selection unit is configured to select the selected component link by selecting, according to a correspondence between component fragment units and component links, a component link corresponding to the component fragment unit; and the sending unit is configured to send the packet on the selected component link by sending the plurality of fragments of the packet on the selected component link.

12. The apparatus according to claim 11, wherein the fragment unit group comprises a first component fragment unit and a second component fragment unit, and in the correspondence between packet priorities and component fragment units, the first priority corresponds to the first component fragment unit, and the second priority corresponds to the second component fragment unit; and wherein in the correspondence between component fragment units and component links, the first component fragment unit corresponds to the first component link, and the second component fragment unit corresponds to the second component link or the first component link.

13. The apparatus according to claim 11, wherein the sending unit is further configured to:

detect whether a traffic shaper of the selected component link allows sending the plurality of fragments;

when the traffic shaper of the selected component link allows sending the plurality of fragments, send the plurality of fragments on the selected component link; and when the traffic shaper of the selected component link does not allow sending the plurality of fragments, select another component link corresponding to the priority to send the plurality of fragments of the packet.

14. The apparatus according to claim 11, wherein the plurality of fragments carry fragment identifiers, causing a receiving end to reassemble the plurality of fragments according to the fragment identifiers.

15. The apparatus according to claim 10, further comprising:

a fragmenting unit, configured to fragment the packet according to the priority of the packet to obtain a plurality of fragments, wherein the plurality of fragments carry the priority information;

wherein the selection unit is configured to select, according to the correspondence between packet priorities and component links, a component link corresponding to the plurality of fragments; and wherein the sending unit is configured to send the plurality of fragments of the packet on the selected component link.

16. A device, comprising:

a communications interface;

a processor; and a non-transitory computer-readable storage medium;

wherein the communications interface, the processor, and the non-transitory computer-readable storage medium communicate with each other by using a bus; and wherein the non-transitory computer-readable storage medium stores an executable program to be executed by the processor, the executable program including instructions to:

receive a packet, wherein the packet carries priority information indicating a priority of the packet;

send, according to a correspondence between packet priorities and component fragment units in a fragment unit group, the packet to a component fragment unit corresponding to the priority of the packet;

configure a correspondence between the component fragment units and component links in a link aggregation group, according to availability of a component link in the link aggregation group and the priority of the packet that corresponds to the component fragment unit;

select a selected component link corresponding to the priority of the packet, according to a correspondence between packet priorities and the component links, and according to the correspondence between the component fragment units and the component links, wherein the link aggregation group comprises a first component link and a second component link, wherein availability of the first component link is higher than availability of the second component link, and in the correspondence between the packet priorities and the component links, a first priority corresponds to the first component link, a second priority corresponds to the second component link and the first component link, and the first priority is higher than the second priority; and send the packet on the selected component link.

17. The device according to claim 16, wherein the executable program further includes instructions for:

determining a priority of the component fragment unit according to the priority of the packet that corresponds to the component fragment unit; and configuring the correspondence between the component fragment units and the component links according to availability of a component link in the link aggregation group and the priority of the component fragment unit.

18. The device according to claim 16, wherein the fragment unit group comprises a first component fragment unit and a second component fragment unit, and in the correspondence between packet priorities and component fragment units, the first priority corresponds to the first component fragment unit, and the second priority corresponds to the second component fragment unit; and wherein in the correspondence between the component fragment units and the component links, the first component fragment unit corresponds to the first component link, and the second component fragment unit corresponds to the second component link or the first component link.

* * * * *